US007424855B2

(12) United States Patent
von Erichsen

(10) Patent No.: US 7,424,855 B2
(45) Date of Patent: Sep. 16, 2008

(54) SLIDE ARRANGEMENT

(75) Inventor: Volker von Erichsen, Recklinghausen (DE)

(73) Assignee: A. Friedr. Flender Aktiengessellschaft (DE)

( * ) Notice: Subject to any disclaimer, the term of this patent is extended or adjusted under 35 U.S.C. 154(b) by 0 days.

(21) Appl. No.: 11/734,739

(22) Filed: Apr. 12, 2007

(65) Prior Publication Data
US 2007/0241300 A1 Oct. 18, 2007

(30) Foreign Application Priority Data
Apr. 13, 2006 (DE) .................... 10 2006 017 832

(51) Int. Cl.
*F16K 3/02* (2006.01)
*F16K 3/314* (2006.01)
(52) U.S. Cl. .............. 110/101 R; 110/173 R; 110/122; 110/498; 110/176; 34/242; 432/242; 251/193; 251/188
(58) Field of Classification Search ........... 110/173 R, 110/122, 498; 34/242; 251/193; 432/242
See application file for complete search history.

(56) References Cited
U.S. PATENT DOCUMENTS
3,722,857 A 3/1973 Townsend
3,985,262 A 10/1976 Nauta
5,261,576 A * 11/1993 Shirley .................. 222/559
6,260,490 B1 * 7/2001 Wark et al. .............. 110/101 R

FOREIGN PATENT DOCUMENTS
DE 246603 3/1986
DE 4243684 6/1994

* cited by examiner

*Primary Examiner*—Steven B. McAllister
*Assistant Examiner*—Nikhil Mashruwala
(74) *Attorney, Agent, or Firm*—Robert W. Becker; Robert W. Becker & Assoc

(57) ABSTRACT

A slide arrangement for blocking or closing off a channel disposed between a coal pulverizer and coal dust burners, and conveying a gas having a high proportion of coal dust. The slide arrangement includes a housing disposed in the channel wall and a shroud or steel structure laterally connected to the housing. A passage for a slide plate is provided in a wall of the housing facing the shroud or steel structure. The passage can be closed off by a closure member except for a narrow gap. The closure member has a circumferential seal that rests against the rearward side of the housing wall. The closure member also has a wear plate that when the closure member is closed is flush with the inner side of the housing wall and forms a smooth passageway.

7 Claims, 2 Drawing Sheets

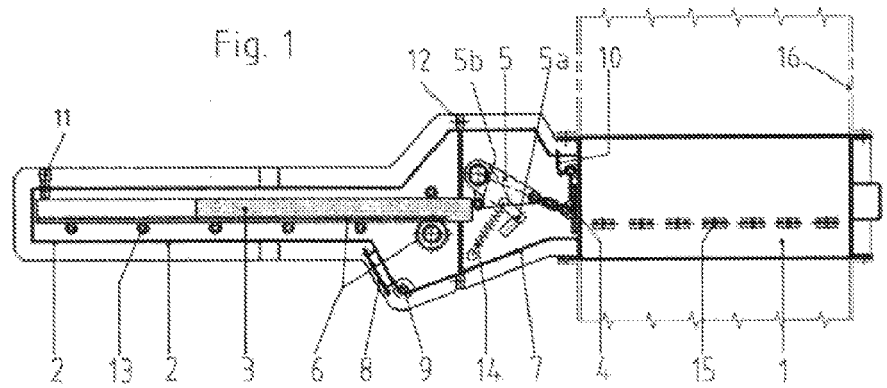
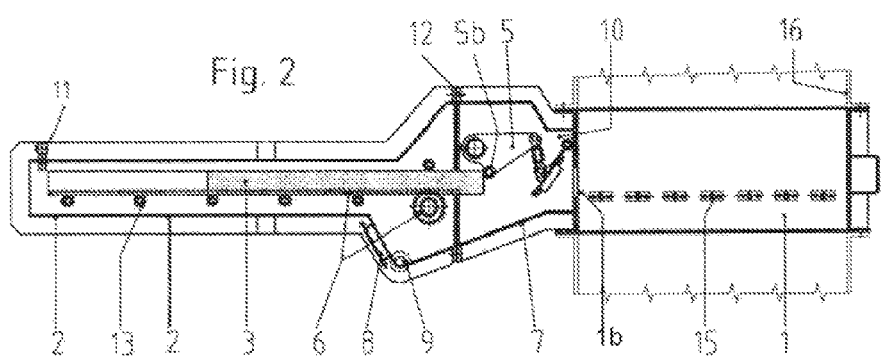
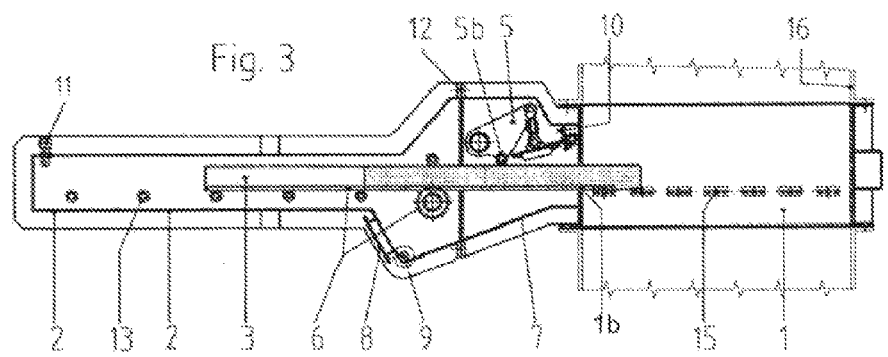
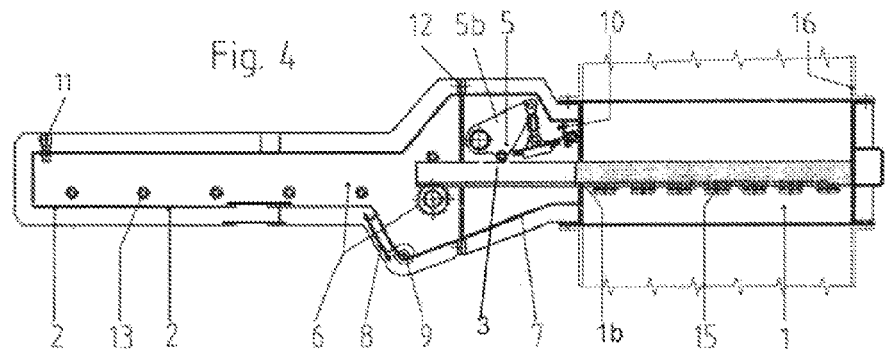

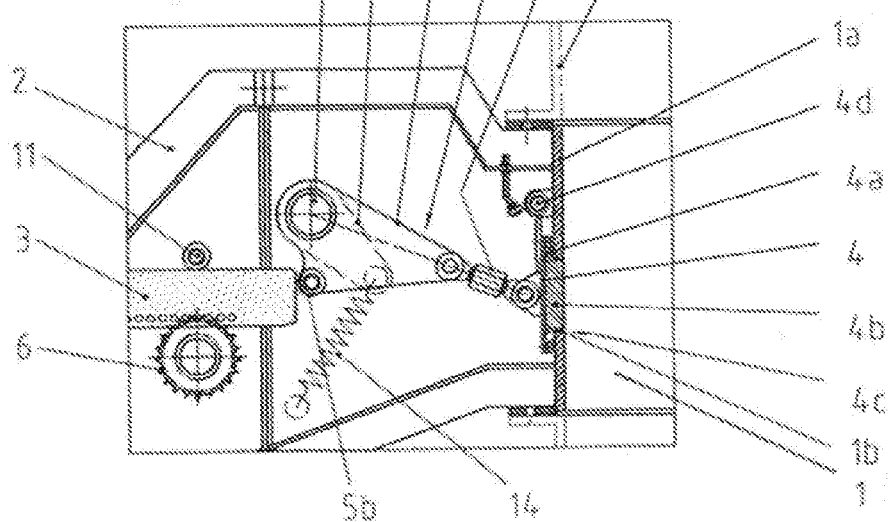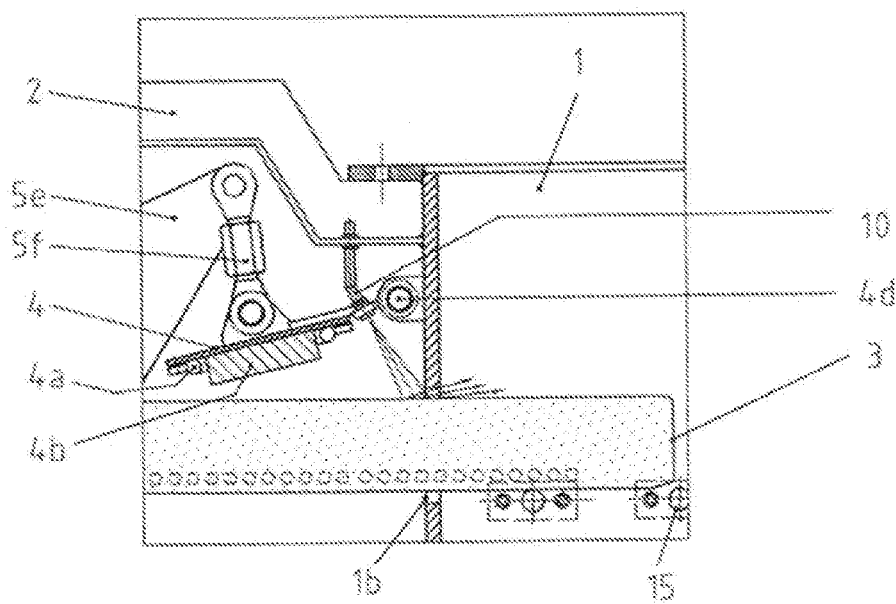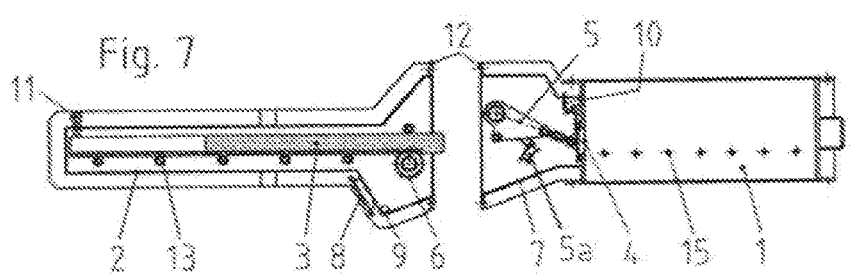

SLIDE ARRANGEMENT

The instant application should be granted the priority date of Apr. 13, 2006 the filing date of the corresponding German patent application 10 2006 017 83267.

BACKGROUND OF THE INVENTION

The present invention relates to a slide arrangement for blocking or closing off a channel that is disposed between a coal pulverizer and coal dust burners, and which guides or conveys a gas having a high proportion of coal dust.

A coal dust/gas mixture having a very high coal dust content of 1,000 g/m$^3$ or more is conveyed in the discharge conduit that leads from the coal pulverizer to the coal dust burners. Due to official regulations, for example the accident prevention regulations, for safety reasons two successively arranged blocking or shut-off means are provided in the discharge conduit, one of which is generally designed as a slide.

Serious problems occur with such slides. For example, all of the components in the channel, and even the channel or housing walls, are subjected to considerable erosion due to the abrasive coal particles. The penetration of coal dust itself through the smallest gap into the shroud of a slide arrangement cannot be prevented due to the very high air moisture of the gaseous conveying medium, and due to the different types of chemical substances in the coal dust, penetrating particles are deposited in the shroud, caked together, and cause considerable corrosion on all of the components or increase the danger of the formation of pools of glowing material, as a result of which a complete inability to operate can occur very rapidly.

A number of constructions have been developed to address the aforementioned problems. These include:

- Plug-in disks that are inserted into a gap formed between two flanges due to the withdrawal of a compensator. Such a construction is functional and economical, but is very work intensive and cannot be automated.
- Different variations of slides with or without shrouds exist that also permit an automatic operation. However, especially with this group, sooner or later the aforementioned problems occur.
- The so-called stuffing box slides form a further group. Here, a flat plate is sealed by a rectangular stuffing box. The non-ribbed slide plate must have an extremely sturdy configuration due to its design for the explosion pressure. Such a construction is acceptable for smaller channels; with larger channels, considerable sealing problems occur due to the expansion of the plate, which damages the seal at the end faces of the plate, which in turn, due to the high underpressure, can lead to considerable contamination in the region of the pulverizers.
- Pivot flaps: which are pivoted up into a side channel pocket, have proven themselves in practice, yet have a number of drawbacks. For one thing, the pivot wing, with its seals, is subjected to continuous wear even in the side pockets, and therefore frequently no longer provides an adequate seal when it must suddenly be put into use. For another thing, such a construction requires a large amount of space for the wings that are to be pivoted up. Such space is often in practice not available above the coal pulverizers.

It is an object of the present invention to embody a slide arrangement of the aforementioned general type in such a way that it is sealed, sturdy, resistant to wear, and resistant to pressure shocks.

BRIEF DESCRIPTION OF THE DRAWINGS

This object and other objects and advantages of the present invention, will appear more clearly from the following specification in conjunction with the accompanying schematic drawings, in which:

FIG. 1 shows one exemplary slide arrangement pursuant to the present application in the open position and with the closure member closed;

FIG. 2 shows the slide arrangement of FIG. 1 at the start of the closure process, whereby the closure member is slightly opened;

FIG. 3 shows the slide arrangement of FIG. 1 during the introduction, whereby the closure member is entirely opened;

FIG. 4 shows the slide arrangement of FIG. 1 in the closed position;

FIG. 5 is an enlarged view of the cover and the knee lever linkage as a portion of the arrangement of FIG. 1;

FIG. 6 is an enlarged view of the cleaning mechanism of the slide arrangement of a portion of the arrangement of FIG. 1; and FIG. 7 shows the shroud of the slide arrangement of FIG. 1 in the separated state.

SUMMARY OF THE INVENTION

The slide arrangement of the present application includes a housing that is disposed in a wall of the channels and a shroud or steel structure that is laterally connected to the housing, whereby a passage for a slide plate is provided in a wall of the housing that faces the shroud or steel structure, the passage can be closed off by a closure member with the exception of a narrow gap, and the closure member is provided with a circumferential seal and a wear plate, wherein the circumferential seal rests against the rearward side of the wall of the housing, and the wear plate is flush with the inner side of the wall and forms a smooth passageway.

The smooth passageway of the housing, in other words without guide strips or pockets, serves to reduce the wear, since components that are subjected to wear due to the gas that is heavily laden with coal dust, which can lead to caking due to turbulence, are eliminated. The closing-off of the passage by the automatically closing cover that closes itself and is open toward the extension side of the slide, and which has a circumferential seal, precludes penetration of dust and moisture into the shroud or the surrounding area to a substantial extent. The opening of the cover by the slide plate as it extends into the housing via the knee lever linkage enables a straightforward and sturdy manner of construction of the slide arrangement. The closure mechanism comprised of the cover and the knee lever linkage can, just like the housing, be designed to be resistant to pressure or one bar explosion pressure, which corresponds to ten times the operating pressure in the chamber.

Further specific features of the present application will be described in detail subsequently.

DESCRIPTION OF SPECIFIC EMBODIMENTS

Referring now to the drawings in detail, a housing 1 of a slide arrangement is disposed in a preferably right-angled channel 16 that represents the discharge conduit between a coal pulverizer and coal dust burners. A wall 1a of the housing 1 is made of a thick material that is resistant to wear (FIG. 5). Provided in the wall 1a of the housing 1 is a passage 1b that is adapted to be closed off by a closure member 4. A plate 4b is placed upon the closure member 4 to fill the passage 1b; the plate 4b is made of the same wear-resistant material as is the wall 1a of the housing 1. On the inner side of the housing 1, the plate 4b, when it is in position, is flush with the wall 1a of the housing. In this manner, a smooth passageway of the housing 1 is produced. The closure member 4 is provided all the way around the plate 4b with a circumferential seal 4a that fills the gap between the closure member 4 and the wall 1a of the housing 1 and prevents dust from escaping. Dust particles can deposit only in a narrow residual gap 4c.

On that side facing away from the channel 16, the housing 1 is connected to a shroud 2 or a steel structure for accommodating a slide plate 3 and an arresting or securing mechanism of the closure member 4. Within the shroud 2 or steel structure, the closure member 4, above its center of gravity, is suspended so as to be able to swing or pivot in a hinged joint 4d mounted on the back side of the wall 1a of the housing 1, so that the closure member 4 closes the passage 1b under its own weight. The closure effect is enhanced by an externally disposed closing spring 14 or some other closure element, such as a closure weight or a gas spring, that acts on the closure member 4 via a knee lever linkage 5d, 5e.

As shown in FIG. 5, the cover/closure mechanism 5 comprises a shaft 5c that is mounted at both sides on the outside on the shroud 2 or steel structure; and has the outer levers 5d, the inner levers 5e and the connecting or pusher rods 5f. By means of the outer levers 5d, a closure moment is produced by the springs that are secured to the shroud 2 or steel structure, and are under tension; the closure moment is transferred to the closure member 4 via the inner levers 5e and the pusher rods 5f. In this connection, the knee lever linkage 5d, 5e moves into the extended position, and hence into an automatic holding position, as a result of which the closure member 4 is firmly pressed against the wall 1a of the housing 1. In this position of the knee lever linkage 5d, 5e an explosion pressure that can possibly result in the channel 16 can be readily absorbed. Depending upon the size of the slide arrangement, the closure elements—springs weights or gas springs—can be disposed on one side, or on both sides.

In the open position of the slide arrangement shown in FIG. 1 the slide plate 3 is in the shroud 2 or steel structure. The slide plate 3 is supported within the shroud 2 or steel structure on maintenance-free guide rollers 13S and is driven by a drive shaft or pin gear 6 that is disposed on the underside of the slide plate 3S as a result of which no deposits are possible that could hinder operation. For narrow slide plates 3, a single pin gear 6 is provided and is disposed in the middle, whereas for larger and wider slide plates 3 pin gears are disposed on both sides.

In the standard design, the pin gear shaft is actuated with a handwheel via a self-locking gear mechanism. Pursuant to a variation, a manual remote operation via a sprocket and chain or via a universal coupling shaft and handwheel can be provided. A fully automatic operation with electric motors is, of course, also possible. The use of pneumatic or hydraulic motors even permits an emergency operation upon the loss of energy via compressed-air tanks bottled gas, or blower tanks.

In a standard design the slide plate 3 has a surface equivalent sealing of 98-99%, whereas special designs having additional sealing sheets achieve values of up to 99.95%.

By means of the drive shaft or pin gear 6, the slide plate 3 is moved out of the rest position into the housing 1 to block or close off the channel 16. Within the housing 1, the slide plate 3 is guided by replaceable, highly wear-resistant guide bolts 15. The position of the slide plate 3 is signaled by inductive limit switches 11 that are actuated by the extending slide plate 3.

In the plane of the slide plate 3, a roller 5b is mounted on the second lever 5e of the knee lever linkage 5d, 5e between the pivot joint and the point of coupling to the closure member 4. In the open position of the slide arrangement, with the slide plate 3 retracted and the closure member 4 closed, the roller 5b of the second lever 5e is in front of the end face of the slide plate 3 (FIGS. 1 and 5).

Upon actuation of the drive shaft or pin gear 6 the extending slide plate 3 presses against the roller 5b and raises the knee lever linkage 5d, 5e, as a result of which at the same time the closing spring 14 or some other closure element, is pretensioned. Along with the raising of the knee lever linkage 5d, 5e effected by the extension of the slide plate 3 the closure member 4 is first slightly opened (FIG. 2) and then entirely opened (FIG. 3), and the passage 1b is uncovered or opened. The slide plate 3 is extended to such an extent that it completely closes off the housing 1 that is disposed in the channel 16 (FIG. 4).

Above the passage 1b, in the region of the hinge joint 4d of the closure member 4, a row of compressed air nozzles 10 can be provided, the jets of which are directed against the slide plate 3 (FIG. 6). These jets blow coal dust that might have fallen onto the retracting or extending slide plate 3 back into the housing 1. The compressed air nozzles 10 are opened only during the operation of the slide plate 3.

Below the passage 1b, the shroud 2 has a funnel-shaped widened portion 7, which is closed off by a maintenance and inspection cover 8. The funnel-shaped widened portion 7 makes it possible on the one hand, even during operation, to observe the closure member 4, the knee lever linkage 5d, 5e and the pin gear 6. On the one hand, the funnel-shaped widened portion 7 is provided with openings 9 on both sides that permit a manual or automatic drainage of moisture and/or a cleaning (see, for example FIG. 1).

On the side facing away from the knee lever linkage 5d, 5e, the shroud 2 is provided with a parting line 12 that extends perpendicular or transverse to the slide plate 3 and as a result of which a shroud part that is welded to the housing 1 is formed and a shroud part that is screwed on is formed. There exists here the possibility after years to carry out an intensive maintenance in a very simple manner by removing the screwed-on shroud part complete with the slide plate 3 and the pin gear 6, and inspecting them at a normal level. A disabling device 5a disposed on both sides of the knee lever linkage 5d, 5e of the closure member 4 even permits such work during operation of the pulverizer (see FIG. 7).

The specification incorporates by reference the disclosure of German priority document 10 2006 017 832.7 filed Apr. 13, 2006.

The present invention is, of course, in no way restricted to the specific disclosure of the specification and drawings, but also encompasses any modifications within the scope of the appended claims.

What I claim is:

1. A slide arrangement for blocking or closing off a channel (16) adapted to be disposed between a coal pulverizer and coal dust burners, wherein the channel (16) is adapted to guide or convey a gas having a high proportion of coal dust (1), comprising:
   a housing (1) disposed in a wall of the channel (16);
   a shroud (2) or steel structure laterally connected to said housing (1);
   a slide plate(3), wherein a passage (1b) is provided in a wall (1a) of said housing (1) that faces said shroud (2) or steel structure, wherein said passage (1b) is adapted to receive said slide plate (3); and a closure member (4), wherein said passage (1*b*) is closable by means of said closure member (4) with the exception of a narrow gap (4*c*), wherein said closure member (4) is provided with a circumferential seal (4*a*) that is adapted to rest against a side of said wall (1*a*) of said housing (1) that is remote from the channel (16), and wherein said closure member (4) is provided with a wear plate (4*b*) that in a closed state of said closure member (4) is flush with a side of said wall (1*a*) of said housing (1) that faces the channel (16) to form a smooth passageway at that location, wherein an elongated, self-supporting knee lever linkage (5d, 5*d*) is provided, wherein said knee lever linkage is adapted to act upon said closure member (4) via externally disposed closure elements, and wherein said closure member (4) is held in said closed state by said closure elements, in which state it is adapted to remain by automatic holding.

2. A slide arrangement according to claim 1, wherein said closure elements are springs (14) or closure weights.

3. A slide arrangement according to claim 1, wherein said slide plate (3) is provided with a drive means, wherein at least one roller (5*b*) is mounted on said knee lever linkage (5*d*, 5*e*) in a plane of said slide plate (3), and wherein upon introduction into said housing (1) said slide plate (3) is in engagement with said at least one roller (5*b*), brings said closure member (4) into an open position via said knee lever linkage (5*d*, 5*e*), and simultaneously pretensions said closure elements.

4. A slide arrangement according to claim 1, wherein said shroud (2) is provided with a funnel-shaped widened portion (7), and wherein at a lowest point of said widened portion (7) at least one opening (9) is provided for drainage and/or cleaning.

5. A slide arrangement according to claim 4, wherein said funnel-shaped widened portion (7) is provided with a maintenance and inspection cover (8).

6. A slide arrangement according to claim 1, wherein cleaning nozzles (10) are disposed in a vicinity of said passage (1*b*) at a level above said slide plate (3), and wherein discharging jets of said cleaning nozzles (10) are directed against said slide plate (3) as it enters into or is withdrawn from said housing (1).

7. A slide arrangement according to claim 1, wherein guide rollers (13) are provided in said shroud (2) or steel structure for supporting said slide plate (3), and wherein replaceable guide bolts (15) are provided in said housing (1) for supporting said slide plate (3).

* * * * *

UNITED STATES PATENT AND TRADEMARK OFFICE
CERTIFICATE OF CORRECTION

PATENT NO.         : 7,424,855 B2                                              Page 1 of 1
APPLICATION NO. : 11/734739
DATED              : September 16, 2008
INVENTOR(S)        : Volker von Erichsen It is certified that error appears in the above-identified patent and that said Letters Patent is hereby corrected as shown below:

On the title page, item:

(73) Assignee: A. Friedr Flender Aktengessellschaft
              (DE)

PLEASE CORRECT TO ACCURATELY READ AS:

(73) Assignee: NEM Power Systems Niederlassung
              (DE)

Signed and Sealed this

First Day of September, 2009

David J. Kappos
*Director of the United States Patent and Trademark Office*